Figure 1:
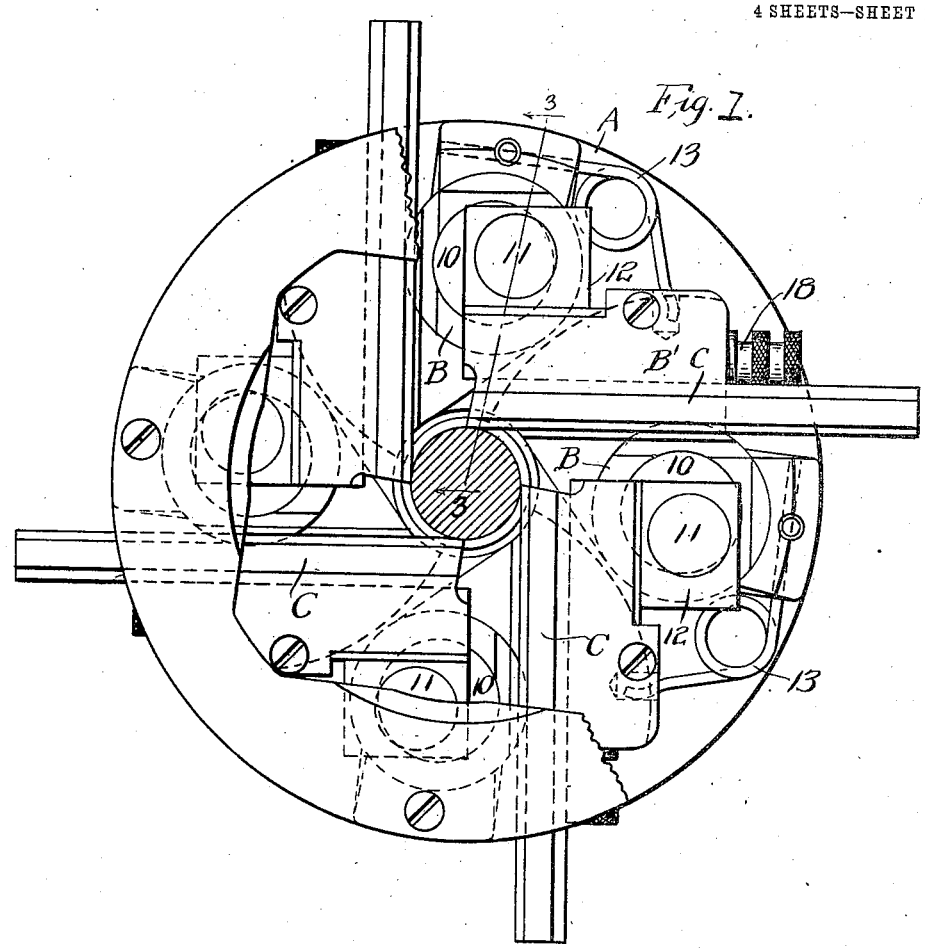

A. B. LANDIS.
CUTTER HEAD.
APPLICATION FILED MAY 7, 1910.

1,017,891.

Patented Feb. 20, 1912.
4 SHEETS—SHEET 1.

Witnesses
L. A. Price.
C. K. Reichenbach.

Inventor
Abraham B. Landis,
By E. W. Bradford
Attorney

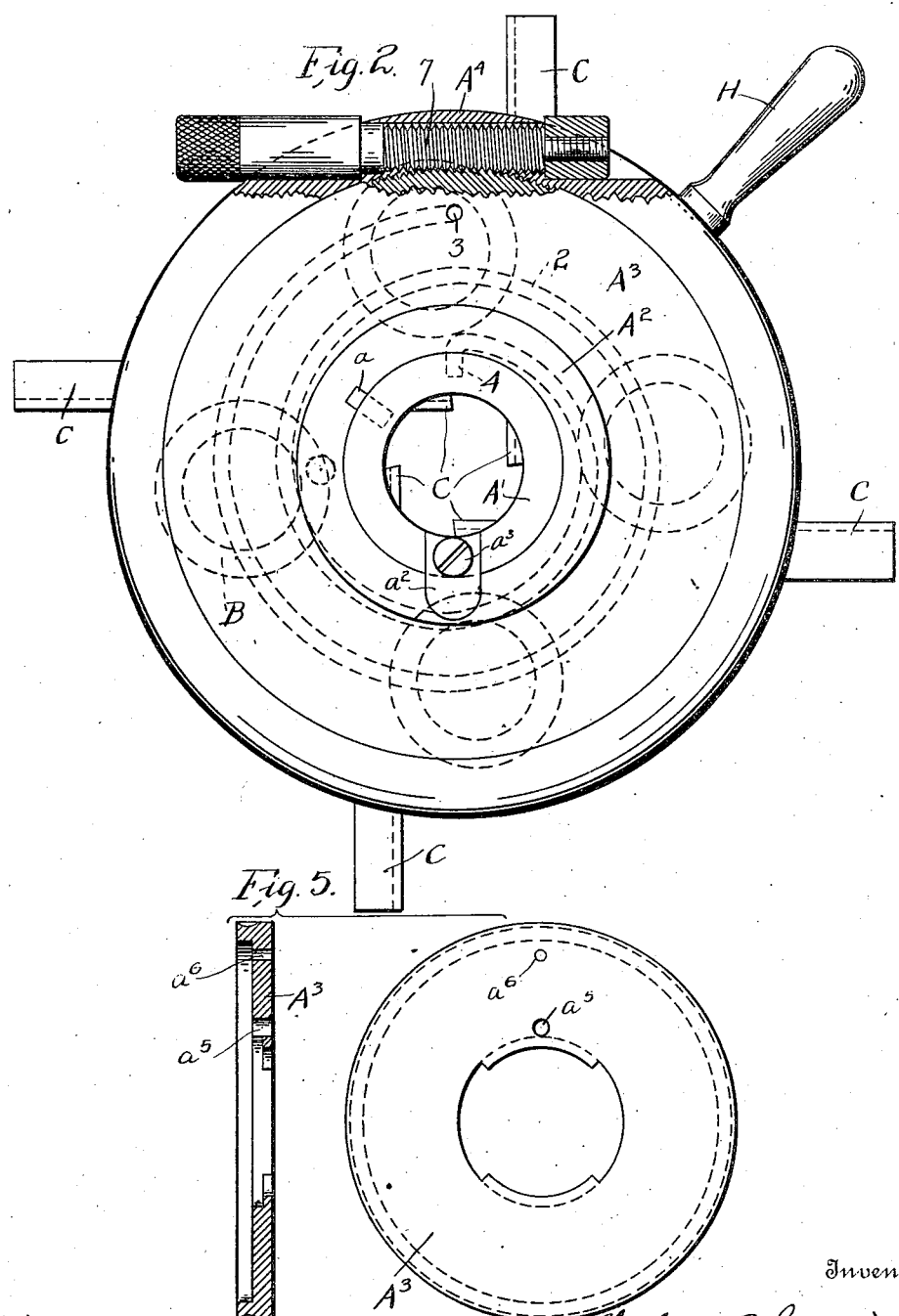

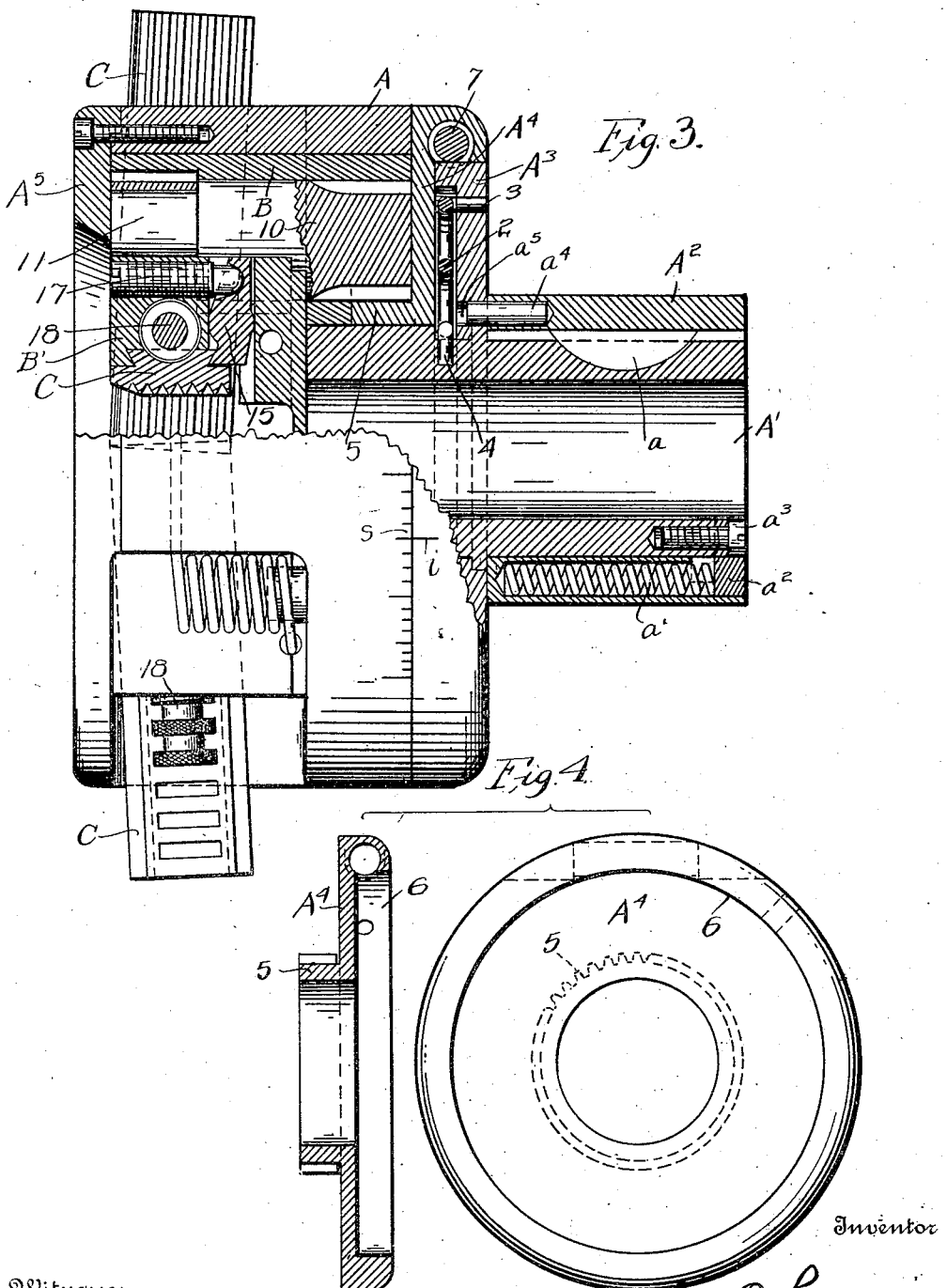

A. B. LANDIS.
CUTTER HEAD.
APPLICATION FILED MAY 7, 1910.
1,017,891.
Patented Feb. 20, 1912.
4 SHEETS—SHEET 4.
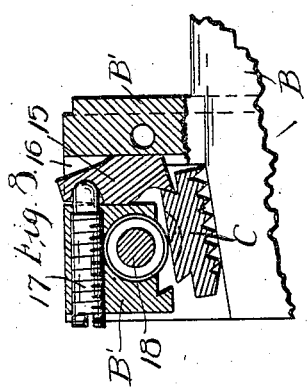
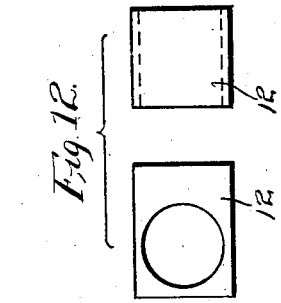
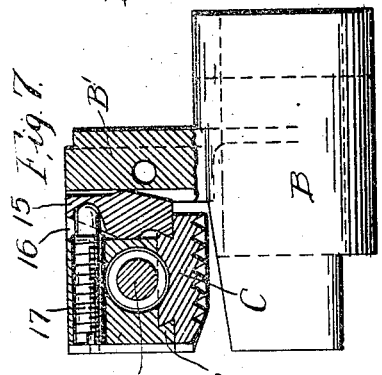
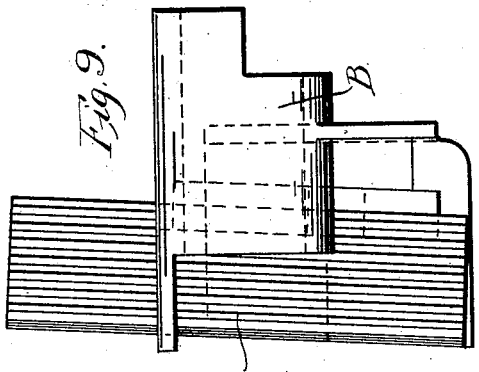
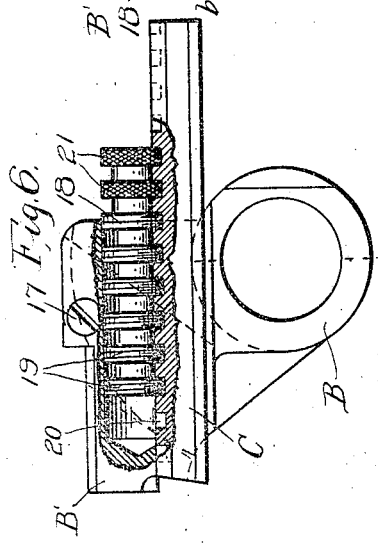
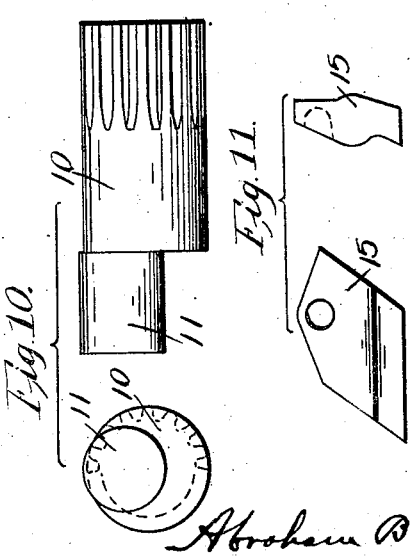
Witnesses
L. A. Price
C. K. Reichenbach
Inventor
Abraham B. Landis
By E. W. Bradford
Attorney

UNITED STATES PATENT OFFICE.

ABRAHAM B. LANDIS, OF WAYNESBORO, PENNSYLVANIA.

CUTTER-HEAD.

1,017,891.  Specification of Letters Patent.  Patented Feb. 20, 1912.

Application filed May 7, 1910. Serial No. 560,089.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in various improvements in the details of construction and arrangement of parts of cutter-heads designed for use on screw-cutting machines, whereby a head is provided for such purposes that is comparatively short, compact and rigid in structure, and one that may be quickly and conveniently adjusted for work of different sizes, and readily opened and closed, all as will be hereinafter more fully described and claimed.

Referring to the accompanying drawings which are made a part hereof and on which similar reference characters indicate similar parts, Figure 1 is a front elevation of a cutter-head of my improved construction, Fig. 2 a rear elevation of the same with the top edge broken out to show one feature of the construction more clearly, Fig. 3 a view chiefly in central longitudinal section on the dotted line 3—3 in Fig. 1, but showing the lower side of the head in elevation, Fig. 4 a view showing a central section and a rear elevation of the ring $A^4$ separately, to better illustrate its particular form, Fig. 5 a similar view of the rear plate $A^3$, Fig. 6 a view of the cutter-holder and cutter partly in side elevation and partly in section, Fig. 7 a view showing the cutter-holder and cutter in cross section and the trunnion in side elevation with the parts in operative position, Fig. 8 a similar view with the cutter in the position it occupies when being removed, Fig. 9 an underside plan of the cutter-holder and the cutters, and Figs. 10, 11 and 12 detail views of separate parts.

In said drawings the portions marked A represent the main part of the body, B the cutter-holder trunnions, and C the cutters.

The body A is a casting of appropriate size to accommodate the various parts of the mechanism and afford seats and bearings therefor and is formed with a central aperture and four bearings for the cutter-holder trunnions distributed equidistant about said central aperture. The rear end of said body is formed with a shank $A'$ which extends inside of a sleeve $A^2$ to which it is secured by a key $a$ set into a seat in said shank $A'$ and engaging with a groove in the sleeve $A^2$. Said sleeve $A^2$ is secured to the spindle, or turret of the machine. A spring $a'$ is mounted in a longitudinal socket in the sleeve $A^2$ bearing between the inner end of said socket at one end and at its other end against a keeper $a^2$ secured by a screw $a^3$ to the rear end of the shank $A'$ and adapted to slide for a limited distance in a notch or recess in the adjacent part of said sleeve $A^2$. Said spring thus normally holds the parts closed, or with the outer end of sleeve $A^2$ abutting the rear face of the head. A locking-pin $a^4$ is mounted in the end of sleeve $A^2$ and is adapted to engage with a perforation in the rear plate of the head for locking the parts against circumferential movement during operation.

A plate or disk $A^3$ is mounted on the shank $A'$ at the rear end of the body A in which the perforation $a^5$ is formed. Said plate is connected with the body A by means of a spring 2 one end, 3, of which projects horizontally into a perforation in plate $A^3$ and the other end, 4, of which projects vertically into a perforation in the body $A'$. Said spring is mounted in a recess within the rim of plate $A^3$ and preferably consists of a plurality of coils the tension of which is exerted to rotate plate $A^3$ around body A for a limited distance when said body is slid outward in sleeve $A^2$ to disengage the locking-pin $a^4$, as will be presently described. Another plate $A^4$ is also mounted on body A having an inwardly projecting hub 5 on the periphery of which are formed gear-teeth and with a rearwardly projecting flange 6 at its outer edge which surrounds the periphery of plate $A^3$. A screw 7 is mounted in a tangential socket in the outer edge of said plate $A^4$ the threads of which are adapted to engage with screw-threads in the periphery of said plate $A^3$ and by the turning of which said plate $A^4$ may be adjusted circumferentially around said plate $A^3$.

The cutter-holder trunnions B are formed with parts $B'$ extending to one side of the axis thereof in which are formed the seats for the cutters. Said trunnions B are formed as best shown in Figs. 3 and 9 with their inner outer corners cut away to accommodate the cutters of the cutter-holder 110 parts of the adjacent holders and with their rear ends cut away on the inner corner to accommodate the hub 5 of the plate A⁴. Each of said trunnions is formed hollow and has mounted therein a cylinder 10 the rear end of which is formed with gear-teeth adapted to engage with the teeth on the outer surface of the hub 5. The outer ends of said cylinders 10 are each formed with an eccentric, or crank-pin, 11 which projects through a perforation in the outer projecting wing 12 on the adjacent cutter-holder B'. The arrangement will be best understood by an inspection of Fig. 1 where it will be seen that each cutter-holder trunnion B carries the cutter-holding part B' on one side thereof and said parts B' have sliding blocks 12, mounted to slide a limited distance on the outer side of their inner ends, through which the crank pins 11 of the cylinders 10 in the trunnions B of the adjacent cutter-holders extend. Springs 13 are seated at one end in a part of the head A and at the other end project into sockets in the outer faces of the parts B, their tension being such as to keep them pressed outward against sliding blocks 12 and tend to turn said cutter-holders on their trunnions to open the die, or to carry the inner ends of the cutters away from the axis of the head. A ring A⁵ is secured on the outer end of head A with its inner edge projecting over the ends of the trunnions B, thus securing said trunnions between said ring A⁵ on the outer end of the head and the plate A⁴ on its rear end against longitudinal movement. Said ring is also of sufficient width to partially cover the outer ends of the crank-pins 11 of cylinders 10 and also sliding blocks 12 and thus prevent any outward movement of the cylinder and hold blocks 12 in place.

The cutters C are of substantially the form shown in other applications heretofore filed by me (for example #542,089 filed February 4, 1910) except that both of the back corners are formed with recesses having overhanging, or dove-tail shaped edges, the outer corners engaging under a correspondingly shaped flange b and the inner edge being engaged by a correspondingly shaped corner of a locking lever-plate 15 mounted in a socket 16 which cuts into the seat for said cutter-holders. Said locking lever-plate 15 is preferably mounted to rock in said socket by means of projecting bearing points on its opposite sides which rest against the walls of said sockets. A screw 17 is mounted in a screw-thread socket in the part B' and its inner end engages with a socket in said locking plate 15 outside its bearings. Thus when said screw is driven into its seat, as shown in Fig. 7, said locking plate will be turned on its bearings so that its tapered point will engage under the tapered flange on the inner back corner of the cutter and clamp said cutter firmly in its seat, while, when said screw is backed out of its seat, as shown in Fig. 8, the weight of the cutter will turn said locking plate on its bearings and permit the cutter to fall out, as shown. Said cutter is held in position and adjusted longitudinally by means of a screw 18 having screw-threaded collars 19 engaging with transverse grooves 20 in said cutter and with screw-threads in the socket in part B' which cuts into the cutter-holder seat. Said screw 18 is also formed on its rear end with knurled collars 21 by which it may be turned to adjust said cutter longitudinally.

The operation of my said invention is as follows: The parts being assembled, as shown in Figs. 1, 2 and 3, and the head mounted upon the machine spindle by means of suitable adjustment between the sleeve A² and said spindle, the operation of cutting proceeds until the limit is reached, when a further rotation of the head operates to slide said head outward in sleeve A² until the plate A³ is disengaged from the rocking-pin $a^4$ when the spring 2 will expand and turn said plate A³ with the plate A⁴ which is connected therewith by means of the screw 7 for a limited distance. Said movement operates through the gear-teeth on the hub 5 of plate A⁴ to rotate the cylinders 10, which, through their crank-pins 11 operate to rock the cutter-holders outwardly and open the die, as has been before described. The sliding of the head outwardly operates to compress spring $a'$ and when it is desired to close the die for the next operation, the operator through a handle H on the periphery of plate A⁴ turns said back plate to its original position until the end of locking-pin $a^4$ registers with the perforation $a^5$, when the spring $a'$ will expand and bring the parts together into locked position.

The die may be adjusted for different sizes of work by turning the screw 7 to adjust the plate A⁴ circumferentially in relation to the plate A³ which operates through the gear connection between said plate and the cylinders 10 to turn said cylinders, and through their crank-pins adjust the size of the die. I have shown a scale s on the periphery of the body A and an indicator mark i on the adjacent surface of the ring A⁴ by which the adjustment of the die may be determined accurately to any point desired, as will be readily seen.

Having thus fully described my said invention, what I claim as new and desire to secure by Letters Patent, is:

1. A cutter-head comprising a body mounted in a sleeve to have a limited longitudinal movement therein, cutter-holders mounted with their trunnions in bearings in said body, cylinders mounted in perforations in said trunnions and formed with crank-pins on their front ends engaging with bearings on the sides of the adjacent cutter-holders and with their rear ends formed with gear-teeth on their peripheries, a plate mounted on the rear end of said body and formed with a hub having gear-teeth engaging with the gear-teeth on said cylinders, means for normally locking said plate to the sleeve, means for rocking said plate automatically when said locking means is disengaged, whereby said cylinders are rocked to open the die, and means for restoring the parts to locked position, substantially as set forth.

2. A cutter-head comprising a body mounted in a supporting sleeve to have a limited longitudinal movement therein, cutter-holders the trunnions of which are mounted in bearings around the axis of said body, the cutter-holders being formed to one side of the axis of each of said trunnions, cylinders mounted in perforations in said trunnions and formed with crank-pins on their outer ends and gears on their rear ends, said crank-pins engaging with bearings in the adjacent cutter-holders and said gears engaging with a single rocking gear, means for securing said rocking gear in a fixed position to hold the die closed, means rocking said gear a limited distance to open the die, and means for returning the parts to locked position, substantially as set forth.

3. A cutter-head comprising a body formed with bearings around its axis for the trunnions of the cutter-holders, said cutter-holders mounted on one side of the axis of a hollow trunnion, said trunnions being mounted in the bearings provided therefor in said body, rocking cylinders mounted in said hollow trunnions having crank-pins on their front ends engaging with the adjacent cutter-holders and gear-teeth on their rear ends, a rocking gear mounted on the rear end of said body engaging with the gears of said several cylinders, a plate connected with said rocking gear by means to permit a circumferential adjustment between them, a locking device adapted to secure said plate to rotate with a head, means for rotating said plate a limited distance independent of the body when said locking means is disengaged, and means for restoring the parts to locked position, substantially as set forth.

4. A cutter-head comprising a body formed with journals for the cutter-holder trunnions around its axis, cutter-holders formed with hollow trunnions, said trunnions mounted in the bearings in said body, rocking cylinders with crank-pins on their front ends mounted in said trunnions with the crank-pins engaging with the adjacent cutter-holders, means for rocking said cylinders to open and close the die, and means for securing said cylinders to hold the die in fixed adjustment, substantially as set forth.

5. A cutter-head comprising a body, cutter-holders journaled on said body around its axis, rocking parts mounted in perforations in the trunnions of said cutter-holders and carrying crank-pins on their front ends, said crank-pins being each engaged with an adjacent cutter-holder, and means for rocking and securing said rocking parts, substantially as set forth.

6. A cutter-head comprising a body mounted in a sleeve, said sleeve, a key for securing said sleeve and body from independent rotation mounted in a seat in one and engaged with a groove in the other, a spring mounted in a socket in said sleeve the outer end of which bears against a keeper secured to a part of the body and adapted to slide in a groove formed in said sleeve at the outer end of said socket, a locking-pin mounted in said sleeve and adapted to engage with a plate carried on said body, said plate, a spring interposed between said plate and said body for normally rocking said plate thereon, the cutter-holders mounted on one side of hollow trunnions, said trunnions mounted in bearings in said body, cylinders mounted in said hollow trunnions formed with crank-pins on their front ends engaging with the adjacent cutter-holders, the rear ends of said trunnions being geared to said rocking plate, substantially as set forth.

7. A cutter-head comprising cutter-holders formed with seats for the cutters, cutters mounted in said seats, and means for clamping said cutters in said seats comprising a pivoted lever fulcrumed in a slot adjacent to the inner edge of said cutters and a screw mounted in a seat in said cutter-holder and adapted to operate said lever, substantially as set forth.

8. A cutter-holder for cutter-heads comprising a seat for the cutter therein, said cutters mounted in said seat its back being formed with a longitudinal cut-under groove at each edge, a fixed flange on the outer edge of the seat for engaging said outer edge and a pivoted lever plate fulcrumed in a slot alongside the inner edge of said cutter the lower edge of said plate being formed with a tapered corner to engage the inner corner of said cutter and a screw mounted in a seat in said cutter-holder the inner end of which is adapted to engage the outer end of said lever whereby it may be operated to clamp or release said cutter, substantially as set forth.

9. A cutter-head comprising a body formed with journals for the cutter-holder trunnions around its axis, cutter-holders formed with trunnions, said trunnions mounted in the bearings in said body, sliding blocks mounted on the outer edge of the ends of said cutter-holders inside their bearings, springs for holding said cutter-holders turned on their trunnions outwardly into engagement with said blocks, rocking cylinders with crank-pins on their front ends mounted in said trunnions with the crank-pins engaging the sliding blocks of the adjacent cutter-holders, means for rocking said cylinders to open and close the die, and means for securing said cylinders to hold the die in fixed adjustment, substantially as set forth.

10. A cutter-head comprising a body, cutter-holders mounted to rock on said body, sliding blocks arranged to bear on the outer edges of said cutter-holders, springs for holding said cutter-holders against said sliding blocks, rocking parts with eccentric bearings engaging with said sliding blocks, means for rocking said parts, and means for securing said parts in fixed adjustment, substantially as set forth.

11. A cutter-head comprising a body, cutter-holders mounted to rock thereon, rocking eccentric parts engaging with said cutter-holders to one side of their pivots for holding and adjusting them, and means for securing said rocking parts, substantially as set forth.

In witness whereof, I, have hereunto set my hand and seal at Washington, District of Columbia, this 30th day of April, A. D. nineteen hundred and ten.

ABRAHAM B. LANDIS. [L. S.]

Witnesses:
  E. W. BRADFORD,
  HARRY L. LANDIS.